(12) United States Patent
Ueno et al.

(10) Patent No.: US 7,293,919 B2
(45) Date of Patent: Nov. 13, 2007

(54) BEARING DEVICE

(75) Inventors: Hiroshi Ueno, Tondabayashi (JP);
Masaaki Ohtsuki, Kashihara (JP);
Shinji Fukuda, Kashiwara (JP); Kenji Sakamoto, Kashiba (JP); Syouji Eguchi, Nara (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 10/526,946

(22) PCT Filed: Sep. 16, 2003

(86) PCT No.: PCT/JP03/11793

§ 371 (c)(1),
(2), (4) Date: Apr. 12, 2005

(87) PCT Pub. No.: WO2004/025130

PCT Pub. Date: Mar. 25, 2004

(65) Prior Publication Data

US 2006/0165328 A1 Jul. 27, 2006

(30) Foreign Application Priority Data

Sep. 13, 2002 (JP) ............................ 2002-267838
Apr. 14, 2003 (JP) ............................ 2003-108707

(51) Int. Cl.
*F16C 33/66* (2006.01)
(52) U.S. Cl. ...................... 384/473; 384/462; 384/471
(58) Field of Classification Search ................ 384/462, 384/466, 468, 471–474, 448; 184/5.1, 26, 184/27, 32, 34, 105.2, 6.28

See application file for complete search history.

(56) References Cited

U.S. PATENT DOCUMENTS

| 2,926,052 | A | * | 2/1960 | Cain, Jr. ..................... 384/473 |
| 3,206,261 | A | * | 9/1965 | Schaefer ..................... 384/471 |
| 4,541,740 | A | * | 9/1985 | Schard ....................... 384/473 |
| 4,609,293 | A | * | 9/1986 | Bayer et al. ................ 384/469 |
| 4,858,427 | A | * | 8/1989 | Provenzano .............. 60/39.08 |
| 4,915,515 | A | * | 4/1990 | Rohrer et al. .............. 384/465 |
| 5,116,145 | A |   | 5/1992 | Jan de Vries |

(Continued)

FOREIGN PATENT DOCUMENTS

JP           3-113119         5/1991

(Continued)

*Primary Examiner*—Thomas R. Hannon
(74) *Attorney, Agent, or Firm*—Jordan and Hamburg LLP

(57) ABSTRACT

A bearing device mountable on a smaller bearing and allowing to be automatically lubricated for a long period, comprising an inner ring and an outer ring rotated relative to each other, cages and rolling elements held by the cages which are disposed in an annular space between the inner and outer rings, a seal ring disposed on both sides of the inner and outer rings, and a unit body formed of a battery, a tank for storing lubricant, and a pump sucking and discharging the lubricant from the tank which is disposed between the outer ring and the inner ring detachably from the seal ring, wherein the lubricant is discharged from the pump into the annular space in which the rolling elements are disposed and the discharged amount of the lubricant from the pump is controlled by a sensor and a control circuit, and the unit body is formed detachable, whereby a lubrication unit installed in the bearing can be made compact and slim.

42 Claims, 13 Drawing Sheets

U.S. PATENT DOCUMENTS

| | | | |
|---|---|---|---|
| 5,312,191 A * | 5/1994 | Gallant | 384/468 |
| 5,423,399 A * | 6/1995 | Smith et al. | 184/5.1 |
| 5,620,060 A * | 4/1997 | Bialke | 184/104.1 |
| 2005/0141796 A1* | 6/2005 | Katsuzawa et al. | 384/473 |

FOREIGN PATENT DOCUMENTS

| | | |
|---|---|---|
| JP | 6-241234 | 8/1994 |
| JP | 6-307458 | 11/1994 |
| JP | 2002-130593 | 5/2002 |
| JP | 2002-213687 | 7/2002 |
| JP | 2002-250352 | 9/2002 |
| JP | 2004-108388 | 4/2004 |

* cited by examiner

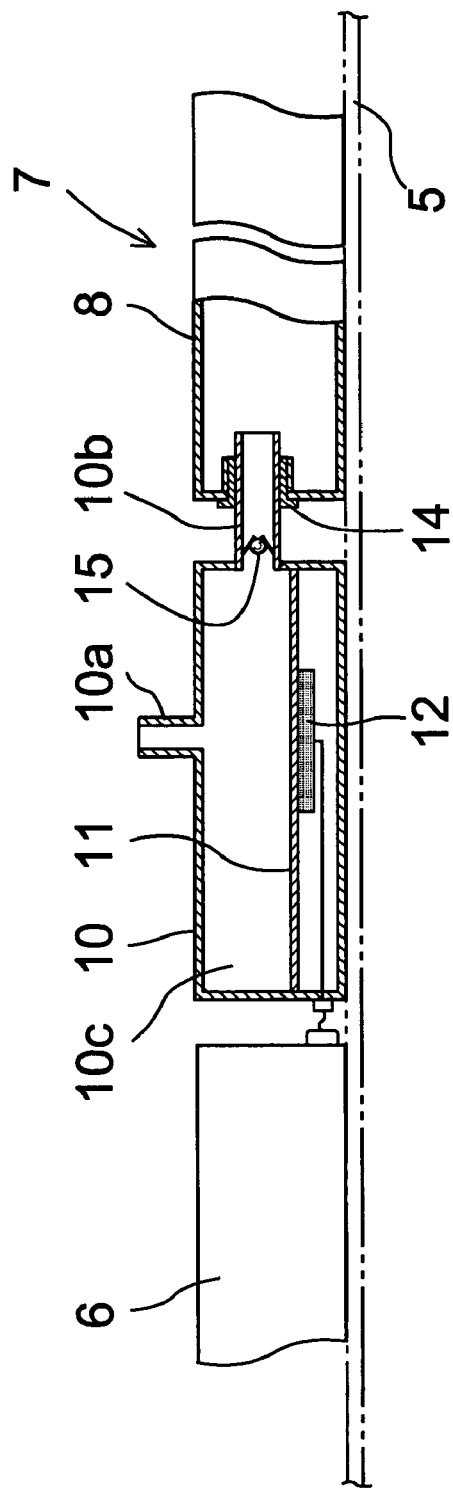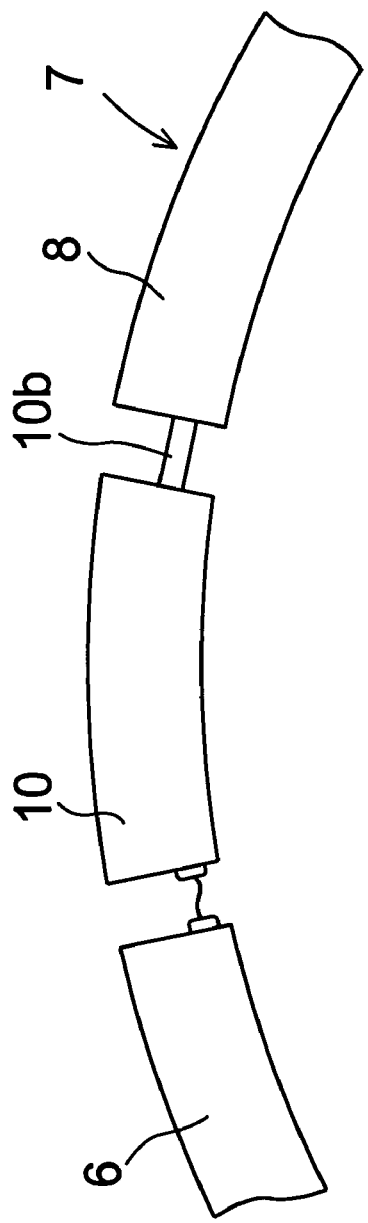
Fig. 8A
Fig. 8B

BEARING DEVICE

TECHNICAL FIELD

The present invention relates to a bearing device, and more particularly to a bearing device in which a lubricant storing tank, a pump, and a driving portion for the pump are disposed as a unit.

BACKGROUND ART

Conventionally, a lubricant supply unit (lubricating device) which supplies a very small amount of lubricant to a rolling bearing has been proposed (see Japanese Patent Publication (Kokai) No. 2002-130593). In the lubricant supply unit, a tank is disposed distantly from a position where the rolling bearing is disposed, a nozzle is disposed so as to face a space between an inner ring and an outer ring of the rolling bearing, and the tank and the nozzle are connected together via a lubricant supply path.

The prior art lubricant supply unit is required to be disposed as a unit separate from the rolling bearing, and hence its installation is troublesome. By contrast, a configuration in which a lubrication pump for discharging lubricant is disposed inside a rolling bearing (see Japanese Patent Publication (Kokai) No. HEI3-113119).

As a bearing device in which lubricant is automatically supplied to a rolling bearing, a bearing device which is to be used in a spindle of a machine tool is known. As shown in FIG. 10, an example of such a bearing device is configured by: a lubricant storage chamber 23 which temporarily stores lubricant supplied from a lubricant tank 21 to a rolling bearing 20 by a pump 22; a diaphragm 24 which is disposed in the lubricant storage chamber 23; a nozzle 25 which is formed in a portion excluding the diaphragm 24; and a piezoelectric element 26 which applies vibrations to the diaphragm 24 so as to fluctuate the pressure of the lubricant storage chamber 23. According to the configuration, the lubricant is supplied to a rolling element 27 and raceway surfaces 20a, 20b of inner and outer rings of the rolling bearing 20 via the nozzle 25 (see Japanese Patent Publication (Kokai) No. 2002-213687).

Alternatively, as a bearing device which is similarly to be used similarly in a machine tool, a bearing device configured so that a larger amount of lubricant is supplied when the temperature of a bearing is raised has been proposed. As shown in FIG. 11(A), the bearing device comprises: a spacer 34 which is fitted onto a rotating shaft 31 adjacently to a bearing inner ring 32 fitted onto the rotating shaft 31; and a lubricant supplying mechanism 30 which supplies lubricant G into a space Q between an outer ring 33 and the inner ring 32. The lubricant supplying mechanism has: a lubricant chamber 36 disposed in the spacer 34; a lubricant flow path 35 through which the lubricant G is supplied from the lubricant chamber 36 to the space Q; a lubricant discharging hole 37; and a lubricant supplying groove 38. The lubricant chamber 36 comprises a lubricant chamber internal pressure adjusting mechanism 39 which is communicatable with or not communicatable with the atmosphere.

The lubricant chamber internal pressure adjusting mechanism 39 is configured by: an atmosphere introducing hole 42 which communicates with the lubricant chamber 36 via an atmosphere introducing groove 40 to equalize the internal pressure of the lubricant chamber 36 with the atmospheric pressure; and a tab 41 which is made of a shape-memory alloy, and which normally closes the atmosphere introducing hole 42 so as to hermetically seal the lubricant chamber 36, and which, when the temperature is raised, deforms so as to cause the atmosphere introducing hole 42 to communicate with the atmosphere (see Japanese Patent Publication (Kokai) No. 2002-250352). FIG. 11(B) is an enlarged view taken along the line M-M in FIG. 11(A), looking in the direction of the arrows.

In the prior art example disclosed in Japanese Patent Publication (Kokai) No. HEI3-113119, the lubricant pump is a vane pump, and has a large external size. Therefore, the size of the rolling bearing is inevitably made larger, and it is necessary to ensure a pump mounting area in the outer ring of the rolling bearing. Accordingly, there is a fear that the cost is increased. In addition, a tank for storing the lubricant must be disposed outside the rolling bearing.

In a conventionally proposed bearing device in which lubricant is supplied, a lubricant supplying device is disposed externally, and a spacer is disposed on the side of the inner ring in addition to the inner ring, so that the required space is large as a whole. Therefore, downsizing thereof is limited. In order to solve such problems, the assignee of the present invention has proposed a rolling bearing device in which lubricant is supplied to rolling elements, or raceway surfaces of a stationary race ring and a rotating race ring on the side of the stationary race ring of the rolling bearing (see Japanese Patent Application No. 2002-267838).

In the rolling bearing device, a lubricant supply unit which supplies lubricant as necessary to the rolling elements, or the raceway surfaces of the stationary and rotating race rings is additionally disposed on the side of the stationary race ring of the rolling bearing. The lubricant supply unit comprises: a tank which stores lubricant; a micro pump which sucks and discharges the lubricant in the tank; and a driving portion (electric generator) which drives the micro pump. In the configuration, however, a magnet and a coil for the generator must be mounted, and hence there are severe restrictions on the space. Thus, it is difficult for the current configuration to be applied to a bearing of a smaller size. In addition, in order to make it possible to be applied to a bearing of a smaller size, it is necessary to provide a bearing device in which the size of the unit is further reduced, and the supply amount of lubricant can be adjusted so as to automatically supply the lubricant for a long term.

The invention has been conducted in order to solve the above-discussed problems. It is an object of the invention to provide a bearing device in which a lubricant supply unit to be attached to a bearing is compact and slim, so that it can be mounted on a bearing of a smaller size and lubricant can be automatically supplied for a long term.

DISCLOSURE OF THE INVENTION

The bearing device according to the invention is a bearing device comprising a plurality of raceway members which perform relative motion, and characterized in that a lubricant supply unit body which supplies lubricant as necessary is additionally disposed between opposed faces of the raceway members, and the lubricant supply unit body comprises a pump which discharges the lubricant, and a driving portion which drives the pump.

As described above, the lubricant supply unit body is additionally disposed in the bearing device, and hence the lubricant supply unit can be easily mounted. In addition, the bearing device can be made more compact. The lubricant supply unit body supplies lubricant to the bearing device as necessary. Consequently, there is not any waste such as that lubricant is supplied in an unnecessary occasion. Thus, it is possible to contribute to the long-term stabilization of the rolling property.

Moreover, the bearing device is characterized in that the driving portion for the pump is an electric generator having a power generating capacity according to the rotational speed of a bearing, and an amount of lubricant discharged by the pump is controlled in accordance with the power generating capacity of the electric generator.

In the case where the driving portion is an electric generator having a power generating capacity according to the rotational speed of the bearing, the amount of lubricant discharged by the pump can be controlled in accordance with the power generating capacity of the electric generator. When the amount of lubricant discharged by the pump is controlled in accordance with the rotational speed of the bearing device as described above, an appropriate amount of lubricant can be supplied, and excess and deficient states can be eliminated.

Moreover, the bearing device is characterized in that the driving portion for the pump is a battery.

Furthermore, the bearing device is characterized in that the battery is a fuel cell.

Moreover, the bearing device is characterized in that the lubricant supply unit body comprises storing means from which hydrogen for the fuel cell can be taken out.

In the above-mentioned means, the fuel cell can drive a functioning element (pump) for a longer time as compared with a primary battery or a secondary battery having the same size, so that automatic operation for a long term can be realized.

Moreover, the bearing device is characterized in that the lubricant supply unit body comprises a lubricant storing tank.

Furthermore, the bearing device is characterized in that the plurality of raceway members and the lubricant supply unit body have a ring-like shape and are disposed coaxially.

In this configuration, since the unit body has a ring-like shape and is disposed coaxially with the raceway members, the entire bearing to which the unit body is attached can be made to have the same shape as the ring-like raceway member. Thus, the bearing device can be incorporated in the same space as that for a usual bearing device, and the degree of freedom in apparatus design is enhanced.

Moreover, the bearing device is characterized in that the plurality of raceway members are a rolling bearing comprising an inner ring, an outer ring, and rolling elements.

Next, the bearing device is characterized in that the lubricant supply unit body comprises a sensor which detects a lubrication condition between the opposed faces of the plurality of raceway members, and the pump is functionally controlled based on a detection output from the sensor.

Moreover, the bearing device is characterized in that the lubricant supply unit body is detachably attached to a vicinity of a shoulder portion of a circumferential face of a stationary-side raceway member which is opposed to a rotating raceway member.

Furthermore, the bearing device is characterized in that the raceway member is a bearing comprising: outer and inner rings each having a raceway surface; rolling elements and a seal ring which are disposed between the rings, and at least the pump, the driving portion for the pump, and the lubricant storing tank are formed in a unit as the lubricant supply unit body, and the lubricant supply unit body is detachably attached to a vicinity of a shoulder portion of an inner circumferential face of the outer ring or an outer circumferential face of the inner ring, or to an inner side face of the seal ring.

Moreover, the bearing device is characterized in that the pump is a diaphragm pump comprising a piezoelectric element and a diaphragm which is displaced in a reciprocating manner by the piezoelectric element.

Moreover, the bearing device is characterized in that the pump comprises a miniature motor, in place of the piezoelectric element.

Moreover, the bearing device is characterized in that the lubricant-storing tank is detachably attached to an outer face of the seal ring, and the driving portion and the pump are additionally disposed on an inner face of the seal ring.

According to the configuration, when the lubricant of the lubricant storing tank is deficient, lubricant can be resupplied to the lubricant storing tank without detaching the seal ring, or the tank itself can be exchanged to another new one.

Furthermore, the bearing device is characterized in that the sensor is a temperature sensor, the temperature sensor is attached to a vicinity of raceway portions of the raceway members, and an amount of lubricant discharged by the pump is controlled by controlling means based on a detection output of the temperature sensor.

Moreover, the sensor may be a temperature sensor, a pressure sensor, or a sensor which detects suspended particles such as mist or dust for the annular space between the raceway members, a vibration sensor which senses vibrations caused by lubrication failure, a sensor which senses AE (Acoustic Emission) generated in conjunction with a damage of the bearing constituting members caused by lubrication failure, and the like. The relationships between output values of these sensors (measured values such as the temperature, the pressure, or the distribution of particles) and the lubrication condition may be previously obtained, the lubrication condition may be predicted from measured values of the sensors, and the pump may be controlled in accordance with a result of the prediction.

According to the means, the lubrication condition of the interior of the bearing can be sensed, and hence the lubrication can be appropriately controlled while monitoring the condition of lubricant.

BRIEF DESCRIPTION OF THE DRAWINGS

FIG. 8 shows the configuration of the bearing device of the second embodiment of the invention, in which FIG. 8(A) is a partial plan view of a battery, a pump, and a tank portion for storing lubricant which constitute a unit body of the bearing device of the invention, and FIG. 8(B) is a front view thereof.

BEST MODE FOR CARRYING OUT THE INVENTION

Figure 1:
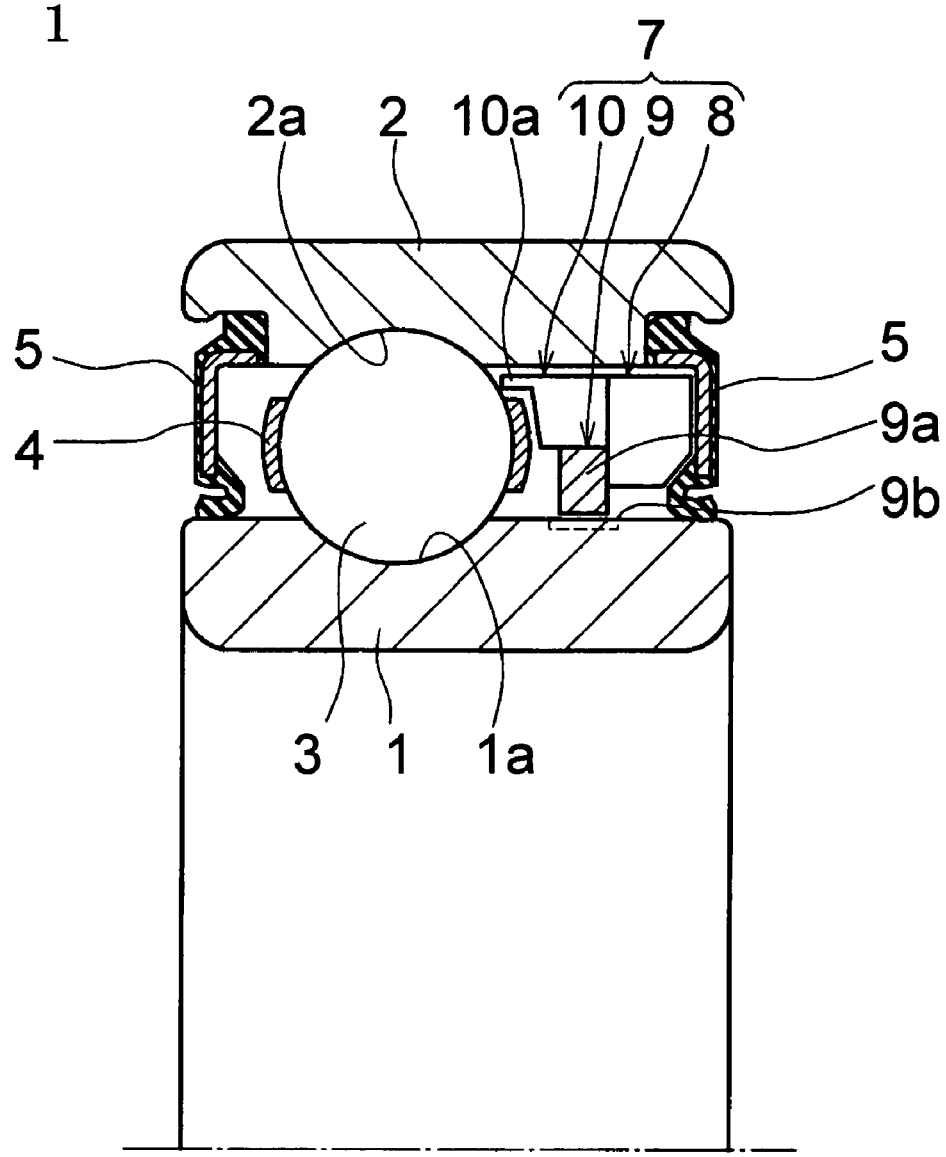
FIG. 1 is a section view showing an upper half of a bearing device of a first embodiment of the invention.
Figure 2:
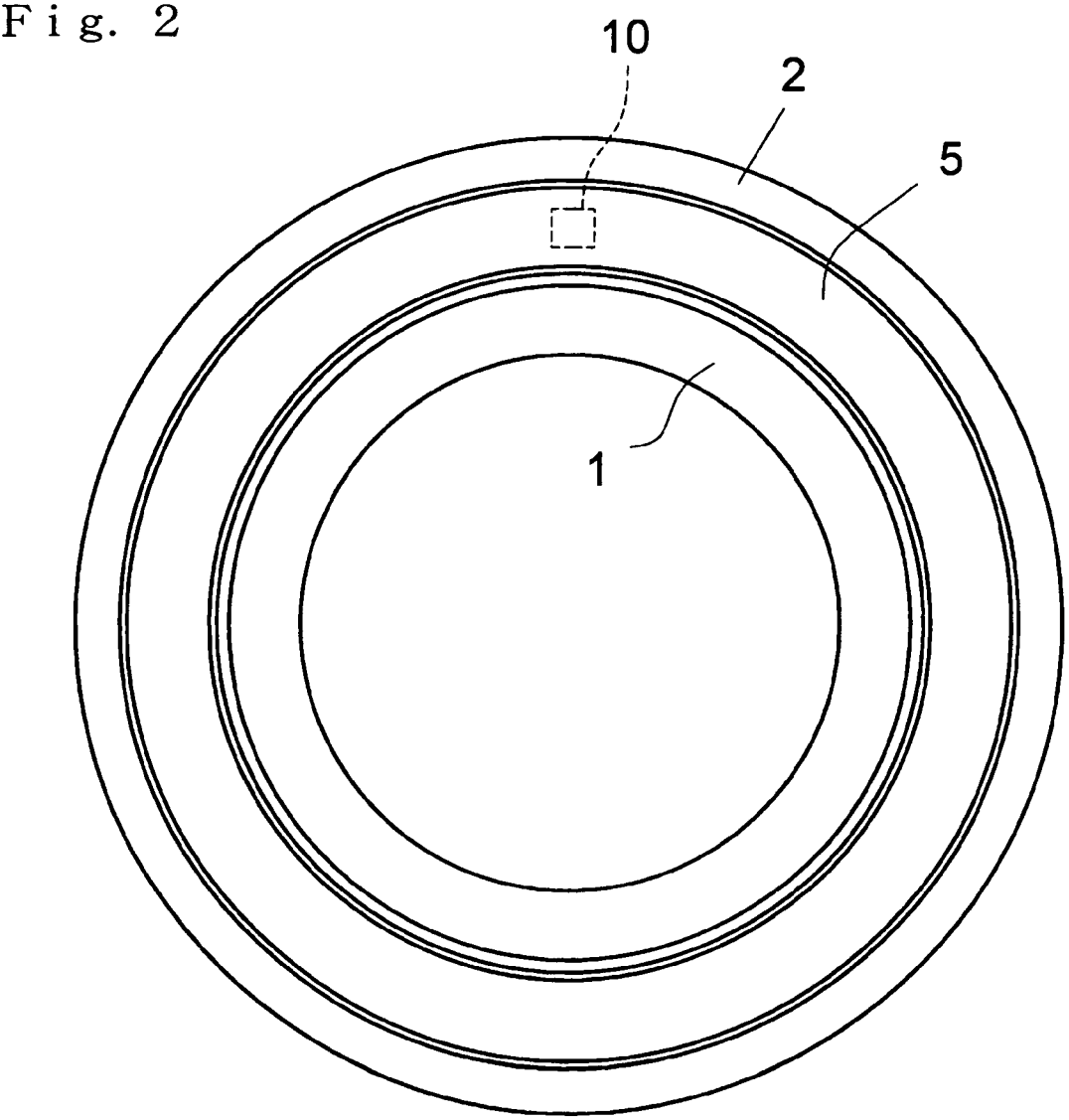
FIG. 2 is a side view of the bearing device of FIG. 1.
Figure 3:
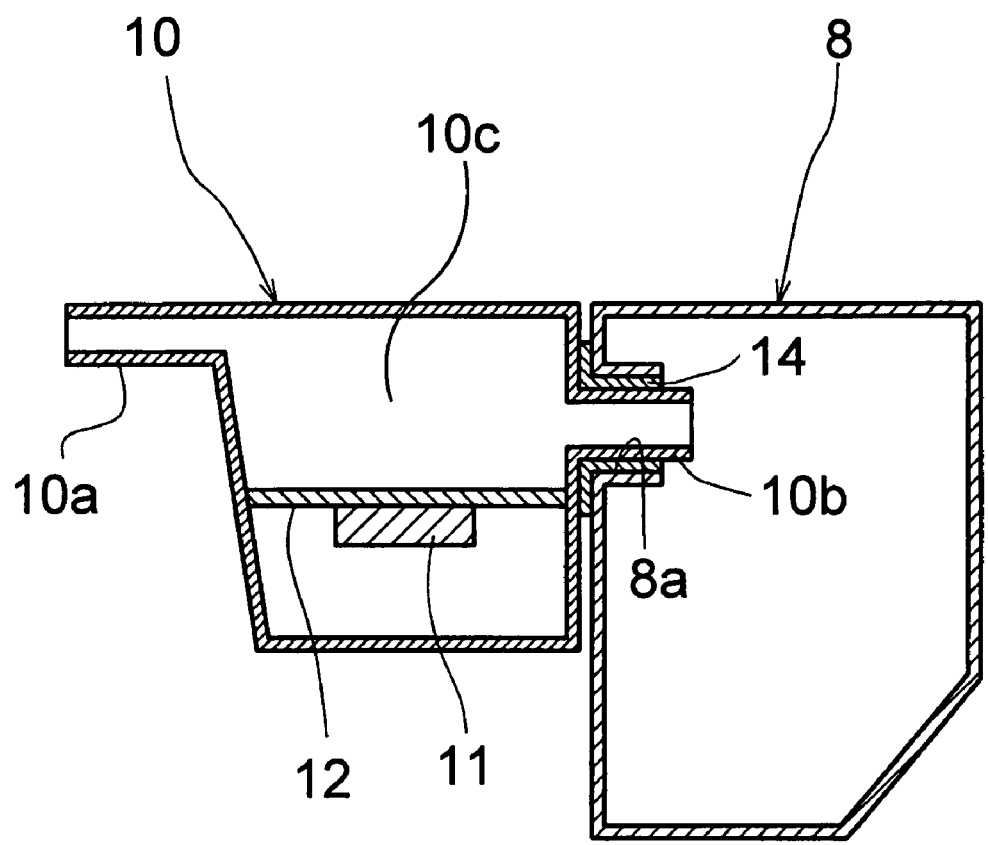
FIG. 3 is a section view showing a structure for coupling a tank with a micro pump in the bearing device of the first embodiment of the invention.

Hereinafter, specific embodiments of the invention will be described. FIGS. 1 to 3 show a first embodiment of the invention. In the figures, 1 denotes an inner ring, 2 denotes an outer ring, 3 denotes a plurality of balls serving as rolling elements, 4 denotes a cage, and 5, 5 denote seal rings.

The illustrated bearing device is a bearing which is a rolling bearing, and which is called a deep groove ball bearing. In the bearing device, the plurality of balls 3 serving as a plurality of rolling elements are interposed between raceway grooves 1a, 2a disposed in the inner and outer rings 1, 2 serving as a plurality of raceway members, and the plurality of balls 3 are held by the cage ring 4 which is called a pressed cage. In the bearing device, the outer ring 2 is a stationary race ring, and the inner ring 1 is a rotating race ring. The seal rings 5, 5 are attached to both shoulder portions of an inner circumferential face of the outer ring 2 serving as the stationary race ring, and are in contact with both shoulder portions of an outer circumferential face of the inner ring 1 serving as the rotating race ring, so as to close openings of both ends in the axial direction of an annular space where the inner and outer rings 1, 2 are opposed to each other.

The embodiment is characterized in that, a unit body 7 (lubricant supply unit body 7) is attached to the inner side of one of the seal rings 5 in the opposed annular space. The lubricant supply unit body 7 comprises a tank 8, an electric generator 9, and a pump (micro pump) 10 having a driven portion. In conjunction with the rotation of the inner ring 1, the electric generator 9 generates electric power to drive the pump 10, thereby supplying lubricant in the tank 8 little by little to a space between the opposed faces of the inner and outer rings (to the vicinity of a raceway groove 2a of the outer ring 2 and the balls 3).

The tank 8 is formed by a hollow annular member for storing lubricant, and bonded to the inner face of the seal ring 5. The tank 8 may not have an annular shape, but may be formed by a segmental annular member disposed in a predetermined angular area on a circle.

The electric generator 9 is configured by a stator 9a which is bonded to the inner face of the tank 8, and a rotor 9b which is formed integrally on one shoulder portion of the outer circumferential face of the inner ring 1. The rotor 9b is formed in such a manner that the inner ring 1 is used as a body, and N poles and S poles are alternately magnetized at regular intervals of the circle. Alternatively, a magnetization ring which is formed in such a manner that N poles and S poles are alternately magnetized at regular intervals of the circle, or the like may be attached to a predetermined position of the outer circumferential face of the inner ring 1.

As the pump 10, a diaphragm pump or the like may be applied. For example, the diaphragm pump attains a pump function in the following manner. A diaphragm 12 serving as the driven portion is displaced in a reciprocating manner by a piezoelectric element 11, whereby lubricant in the tank 8 is sucked into a pump chamber 10c, and the lubricant is discharged from a nozzle 10a for discharging lubricant. The piezoelectric element 11 is energized by the electric generator 9. In place of the piezoelectric element 11, a miniature motor or the like may be used. The nozzle 10a of the pump 10 is directed to the vicinity of one end of the raceway groove 2a of the outer ring 2, and the balls 3.

As shown in FIG. 3, the tank 8 and the micro pump 10 are communicatingly coupled to each other in such a way that a nozzle 10b for sucking lubricant disposed in a side face of the micro pump 10 is fitted into a hole 8a for supplying lubricant disposed in a side face of the tank 8 via a rubber tube 14.

As described above, the tank 8 of the lubricant supply unit body 7 is attached to one of the seal rings 5, so that the tank 8 can be easily detached after the seal ring 5 is detached. Therefore, mounting and dismounting of the tank 8 can be easily conducted, and the whole rolling bearing device can be made more compact. When the lubricant in the tank 8 is deficient, the tank 8 is detached together with the seal ring 5. Then, lubricant can be resupplied into the tank 8, or the tank 8 itself can be exchanged with another new one.

The electric generator 9 has a power generating capacity corresponding to the number of revolutions of the rolling bearing. In accordance with the power generating capacity of the electric generator 9, the amount of lubricant discharged by the micro pump 9 is controlled. For example, in a region where the number of revolutions of the inner ring 1 is low, a very small amount of lubricant is sprayed directly to the balls 3 and the vicinity of the raceway groove 2a of the outer ring 2, and, in a region where the number of revolutions is high, lubricant of an amount according to the rotational speed is sprayed.

In this way, in the above-described rolling bearing device, lubricant can be continuously supplied over a long term without producing excess and deficient states to the rolling area of the balls 3 of the rolling bearing, so that the rolling bearing device can contribute to the long-term stabilized condition of the rolling characteristic and the prolonged lifetime.

The invention is not restricted to the above-described embodiment, and various applications and modifications can be considered. In the above-described embodiment, although not shown in the figures, the tank 8 may be detachably disposed to the outer face of the seal ring 5, and the electric generator 9 and the pump 10 may be disposed on the inner face of the seal ring 5. In this case, when the lubricant of the tank 8 is deficient, lubricant can be resupplied to the tank 8 or the tank 8 can be exchanged to another new one, without detaching the seal ring 5.

In the above-described embodiment, for example, it is possible to control the discharging amount of lubricant by the pump 10 in accordance with the lubrication condition of the rolling bearing. The lubrication condition can be recognized based on, for example, the temperature of the rolling bearing. Thus, a temperature sensor such as a thermocouple may be attached to the vicinity of a raceway portion of the rolling bearing, and the discharging amount of lubricant by the micro pump 10 can be controlled by a control circuit based on a detection output of the temperature sensor. The control circuit may be attached to the rolling bearing, or alternatively may be attached to a supporting portion which supports the rolling bearing, or to another portion.

Although the bearing type of the rolling bearing is the deep grove ball bearing, the invention can be applied also to various other known types. The type of the cage ring 4 may be a machined cage, a cage made of a synthetic resin, or the like, in place of a pressed cage.

Next, FIGS. 4 to 8 show a second embodiment of the invention.

Figure 4:
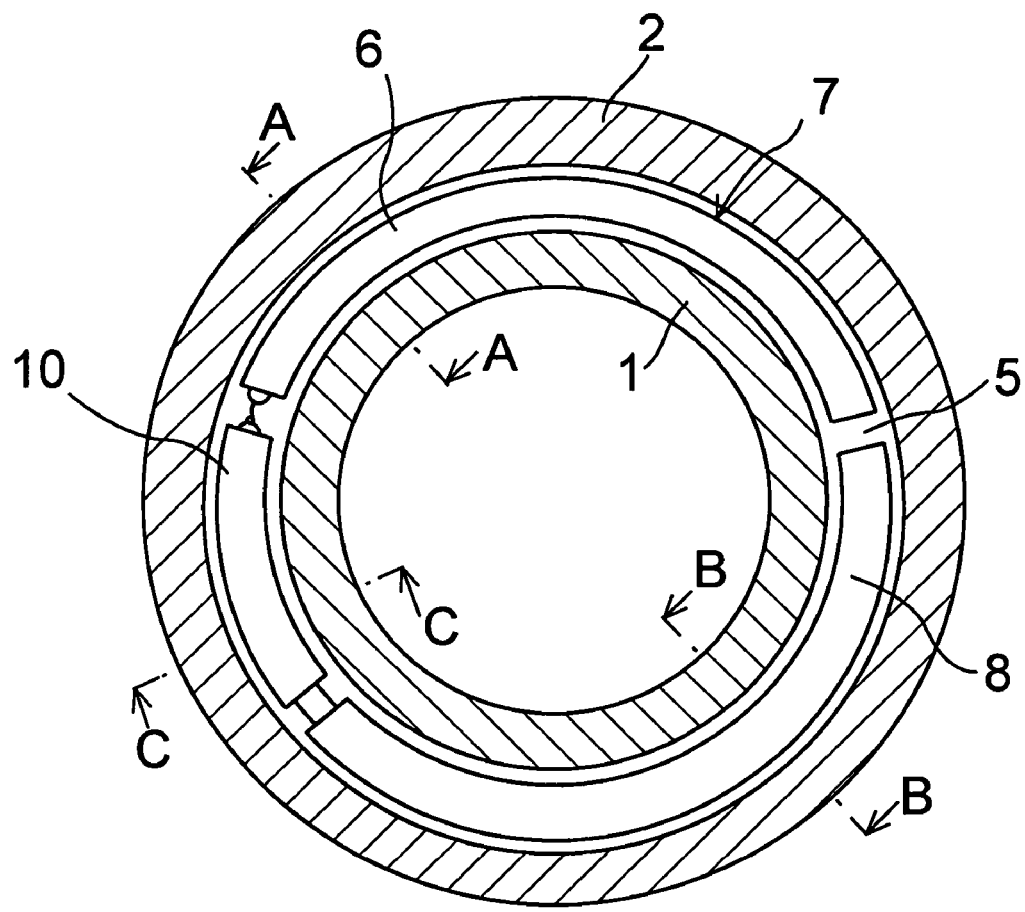
FIG. 4 is a section view showing the configuration of a bearing device of a second embodiment of the invention, looking in a direction perpendicular to the axial direction.
Figure 5:
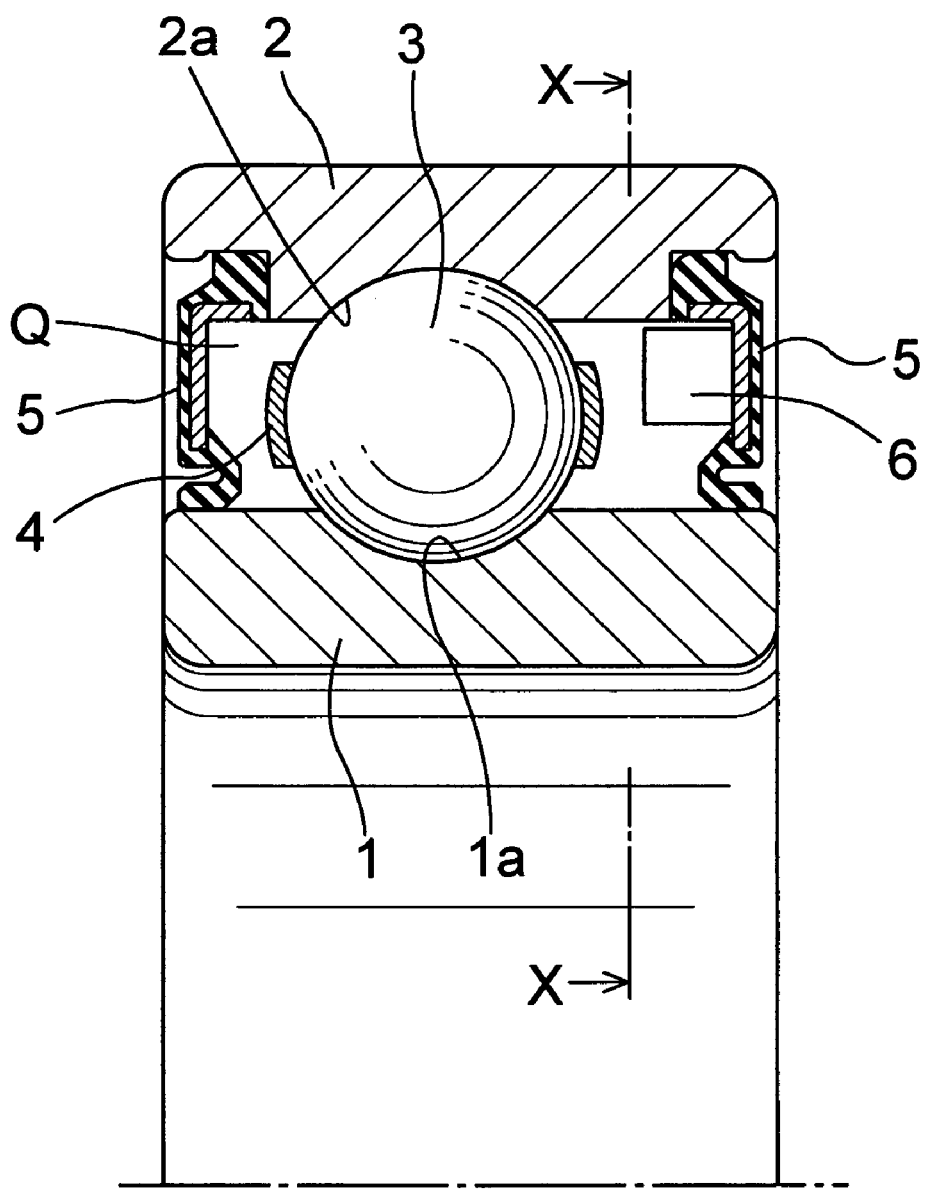
FIG. 5 is a section view taken along the line A-A in FIG. 4 looking in the direction of the arrows, and showing part of the configuration of the bearing device of the second embodiment of the invention.
Figure 6:
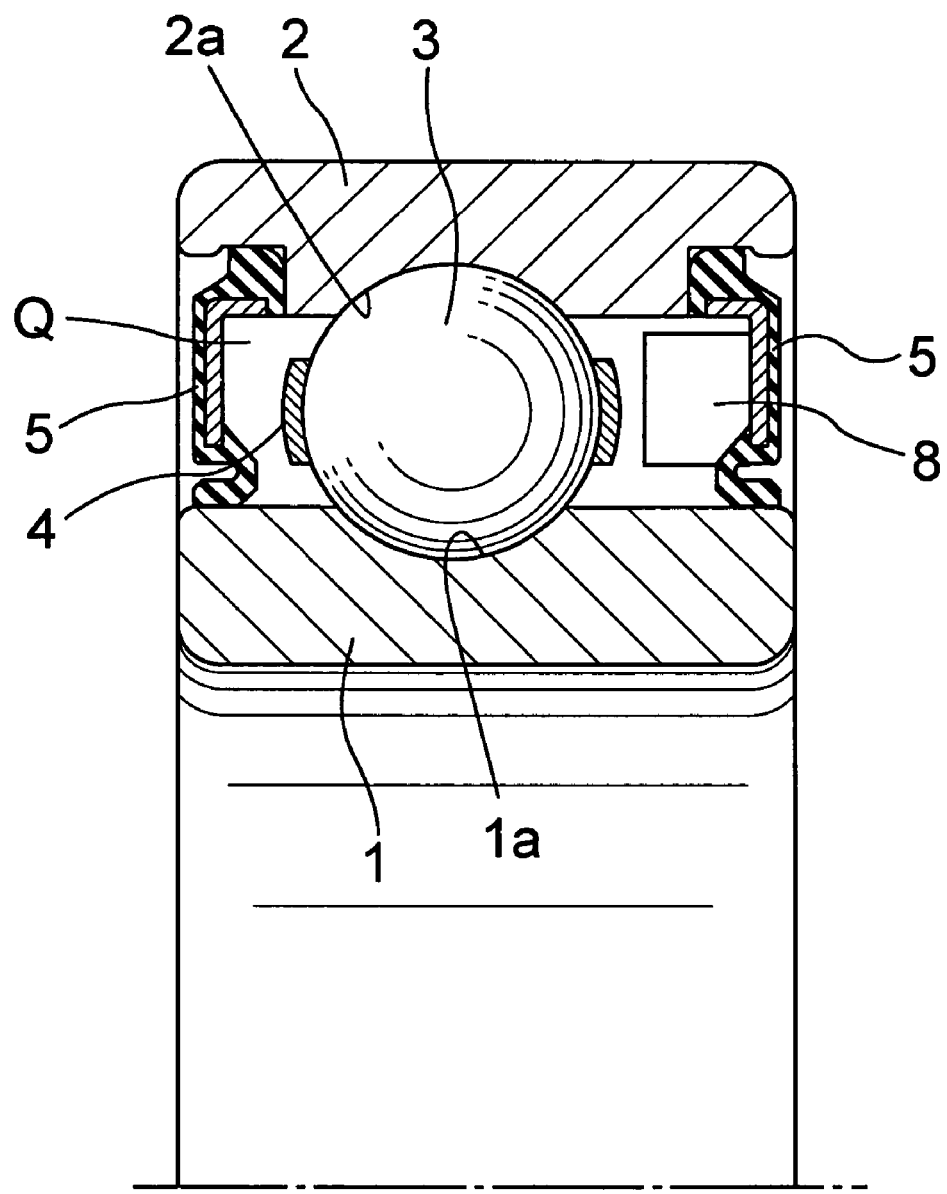
FIG. 6 is a section view taken along the line B-B in FIG. 4 looking in the direction of the arrows, and showing part of the configuration of the bearing device of the second embodiment of the invention.
Figure 7:
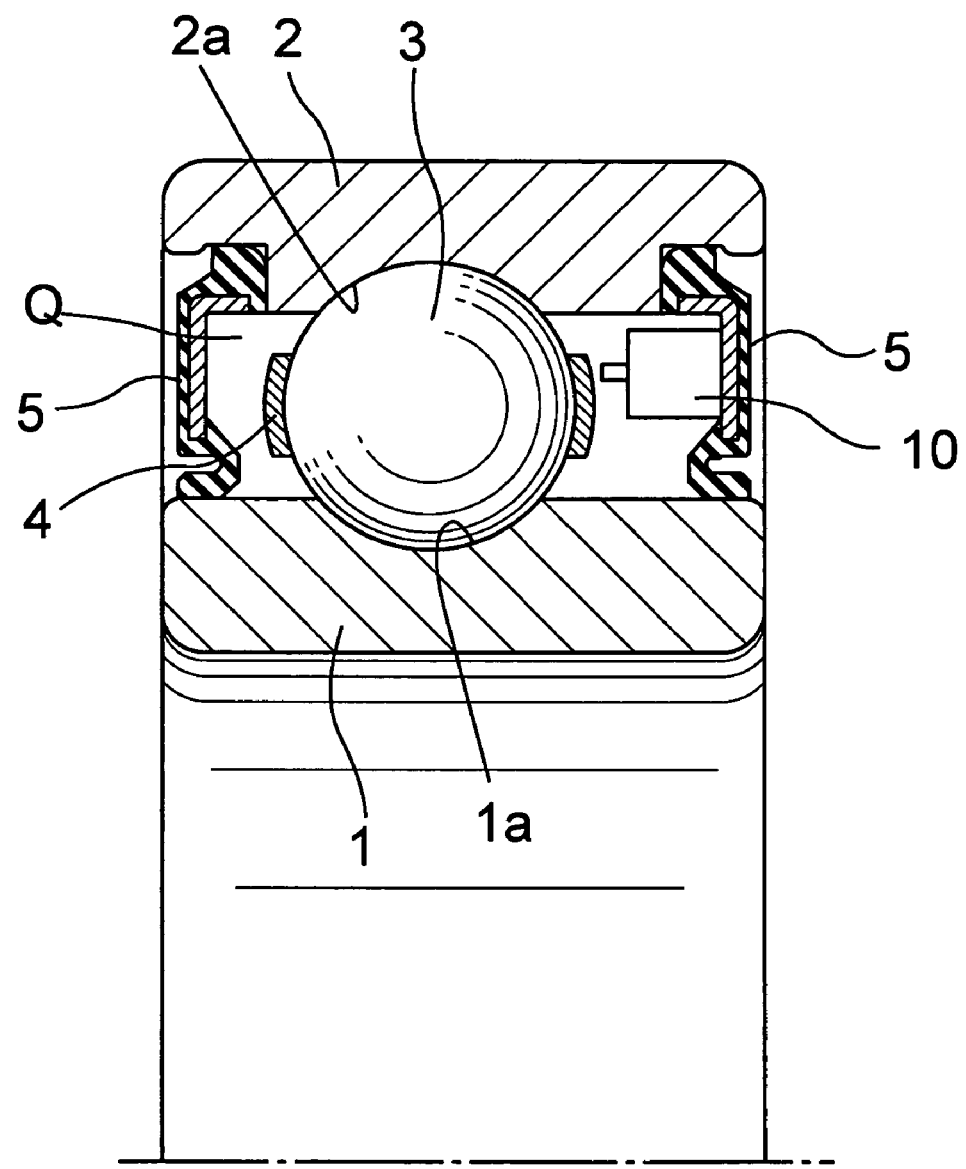
FIG. 7 is a section view taken along the line C-C in FIG. 4 looking in the direction of the arrows, and showing part of the configuration of the bearing device of the second embodiment of the invention.

FIG. 4 is a section view showing the configuration of the second embodiment of the bearing device of the invention, looking in a direction perpendicular to the axial direction (a view along the line X-X looking in the direction of the arrows in FIG. 5 which will be described below). FIG. 5 is a section view taken along the line A-A looking in the direction of the arrows in FIG. 4, FIG. 6 is a section view taken along the line B-B looking in the direction of the arrows in FIG. 4, and FIG. 7 is a section view taken along the line C-C looking in the direction of the arrows in FIG. 4.

The bearing device is configured by: an inner ring 1 and an outer ring 2 which serve as ring-like members (raceway members); rolling elements (balls) 3 which are disposed at regular intervals in a circumferential direction of an annular space P between opposed faces of the outer and inner rings; a cage 4 which holds the rolling elements 3; seal rings 5, 5 which hermetically seal the annular space P; and a unit body 7 which is disposed on the side of either one of the seal rings 5, 5.

The unit body 7 is configured by a battery 6, a tank 8 for storing lubricant, and a function body which is driven by the battery to function, for example, a pump (micro pump) 10. All of these components have an arcuate shape, and are coupled so as to constitute the ring-like unit body 7. In this case, the pump 10 is arcuate. The pump sucks lubricant from the arcuate tank 8 in which the diameter is substantially equal to that of the arc of the pump, and discharges the lubricant to a space between opposed faces of the raceway members (in directions toward the rolling elements (balls) 3 in the annular space Q, a raceway surface 1a of the inner ring 1, and a raceway surface 2a of the outer ring 2). The battery 6 also has an arcuate shape in which the diameter is substantially equal to that of the above-mentioned arc.

The unit body 7 comprising the battery 6, the pump 10, and the like which have an arcuate shape is coupled and placed in a ring-like shape, and set to be detachable. For example, the unit body is detachably attached to an inner side face of one of the seal rings 5. Alternatively, the unit body may be fixed to a ring-like plate member (not shown) other than the seal ring 5, and the plate member is detachably attached to an outer circumferential face of the inner ring 1 or an inner circumferential face of the outer ring 2 serving as the rotating members, or to a side face of the seal ring 5.

As described above, the unit body 7 is detachably attached. When the battery 6, the pump 10, or the like which constitutes the unit body 7 does not operate properly, therefore, it can be exchanged, or the battery 6 can be charged. When the lubricant storing tank 8 becomes empty, lubricant can be resupplied.

Since the unit body 7 is formed into a ring-like shape having a diameter which is substantially equal to that of the ring-like rolling bearing, the whole bearing device to which the unit body is attached has a ring-like shape which is similar to the shape of the rolling bearing. Even in the case where the bearing is incorporated into a spindle of a machine tool, or the like, therefore, the bearing device can be incorporated by the same method and in the same space as those for a prior art bearing. As the battery 6, in the case where the battery is exchangeable, a primary battery may be used. Alternatively, a fuel cell may be used as described later.

FIG. 8 shows a specific example in which, in the bearing device of the invention having the above-described configuration, the battery 6 is used as a driving source, and lubricant is supplied from the lubricant storing tank 8 by means of the pump 10 (micro pump 10) in directions to the rolling elements (balls) 3 between the opposed faces of the raceway members, the raceway surface 1a of the inner ring 1, and the raceway surface 2a of the outer ring 2.

As the micro pump 10, a pump of the diaphragm type is preferably used because it has a simple structure. Namely, a diaphragm 12, a nozzle 10a for discharging lubricant, and a nozzle 10b for sucking lubricant are disposed in a pump chamber 10c. For example, a piezoelectric element 11 is attached to the diaphragm 12. The pump chamber 10c and the lubricant storing tank 8 are coupled so that their interiors communicate with each other through the nozzle 10b for sucking lubricant. The circumference of the nozzle 10b for sucking lubricant is sealed by a rubber tube 14. In order to prevent the lubricant from reversely flowing during the driving time of the diaphragm 12, a check valve 15 is disposed in the nozzle 10b for sucking lubricant.

In the thus configured bearing device, when the lubricant is to be supplied to the rolling elements 3 disposed in the annular space Q between the inner ring 1 and the outer ring 2, the raceway surfaces 1a, 2a, or the like, the micro pump 10 is driven by the battery 6. Specifically, the diaphragm 12 is pulsated by utilizing the piezoelectric element 11, to discharge the lubricant from the nozzle 10a.

In this case, the conditions of the bearing such as the internal temperature or the bearing rotational velocity may be detected by sensors, and a control circuit may be disposed between the battery 6 and the micro pump 10, so that the supply amount of lubricant is adjusted in accordance with the conditions.

In the above description, the pump 10 is a pump of the diaphragm type having a simple configuration for supplying lubricant to the annular space Q between the inner ring 1 and the outer ring 2. Alternatively, various pumps such as a jet pump, a vane pump, a screw pump, or a piezo pump may be used. In such cases also, the pump, the tank, and the battery have arcuate shapes having substantially the same diameter, and are coupled together to form one ring-like unit body.

In place of the pump 10, various members which can be driven by the battery 6 may be incorporated. For example, in addition to the above-mentioned (micro) pump 10 for supplying lubricant, a microminiature cooling fan for cooling the inside of the bearing, an alarm for giving an alarm about an abnormal temperatures, a monitoring device for excess and deficient states of the lubricant inside the bearing, and the like are considered.

Next, the bearing device of the invention may comprise a sensor for detecting lubrication conditions of the annular space Q between the raceway surfaces of the outer ring 1 and the inner ring 2. As the sensor, a thermocouple for detecting the temperature in the annular space Q such as the temperature of the raceway surface may be attached to the vicinity of the raceway portion. Based on the level of the temperature, it is possible to determine whether the lubricant is excess or deficient. The detection output of the thermocouple is fed back to the control circuit, to control the amount of the lubricant discharged by the pump so as to be increased or decreased. The control circuit can be disposed in an appropriate position of the outer circumferential face of the inner ring, the inner circumferential face of the outer ring, or the seal ring 5.

Figure 12:
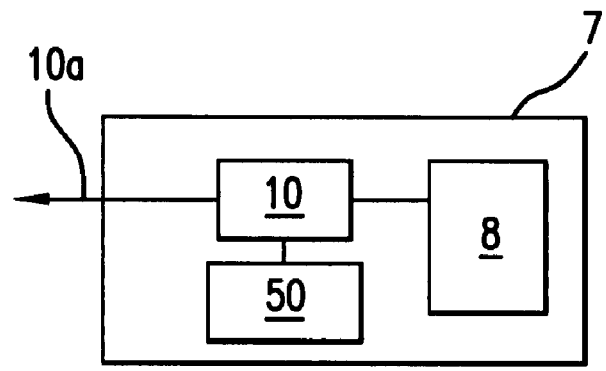
FIG. 12 is a block diagram schematic of another embodiment of the unit body of the present invention.

As the sensor in such a case, in addition to the thermocouple for monitoring the temperature, sensors such as a pressure sensor, an optical sensor which detects suspended particles such as mist or dust, a vibration sensor which senses vibrations caused by lubrication failure, and a sensor which senses AE (Acoustic Emission) generated in conjunction with a damage of bearing constituting members caused by lubrication failure are considered. The relationships between the measured values of the sensors and the lubrication condition may be previously obtained, and the pump may be controlled as necessary. Referring to FIG. 12, the unit body 7 optionally includes the sensor in the form of sensor 50 which detects a lubrication condition between opposed faces of raceway members 1(2), and the pump 10 is functionally controlled based on a detection output from the sensor 50.

Figure 13:
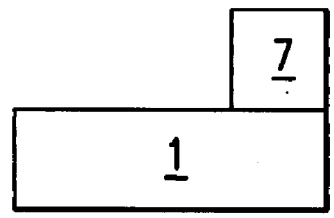
FIG. 13 is a block diagram schematic of another embodiment of a mounting configuration of the unit body of the present invention.
Figure 14:
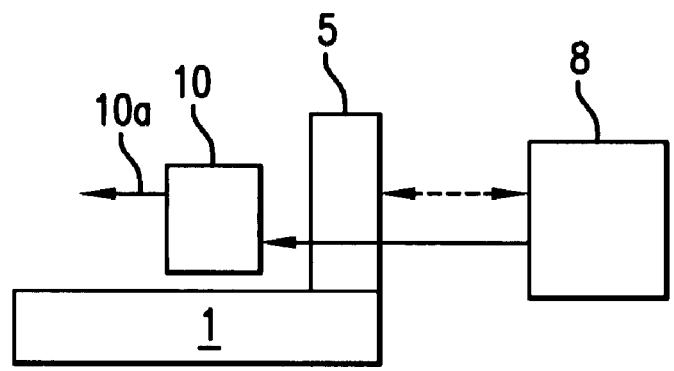
FIG. 14 is a block diagram schematic of yet another embodiment of a mounting configuration of a tank of the present invention.

As described above, according to the bearing device of the invention, in the bearing comprising the inner ring 1 and the outer ring 2 serving as ring-shape members, the rolling elements 3, the cage 4, and the seal rings 5, the unit body 7 including at least the battery 6, the pump 10, the lubricant storing tank 8, and the like is detachably attached to the vicinity of a shoulder portion of the outer circumferential face of the inner ring 1 or the inner circumferential face of the outer ring 2, or on the side face of the seal ring 5. That is, in the case where the inner ring 1 is to be rotated, the unit body 7 is detachably attached to the side of an end portion of the inner circumferential face of the outer ring 2. Tn the case where the outer ring 2 is to be rotated, the unit body 7 is detachably attached to the side of an end portion of the outer circumferential face of the inner ring 1 as shown in FIG. 13. Alternatively, the unit body 7 may be detachably attached to the side face of the inner or outer circumference of the seal ring 5. Still further, the lubricant storing tank 8 is optionally detachably connected to an outside face of the seal ring 5 as represented in FIG. 14.

Figure 15:
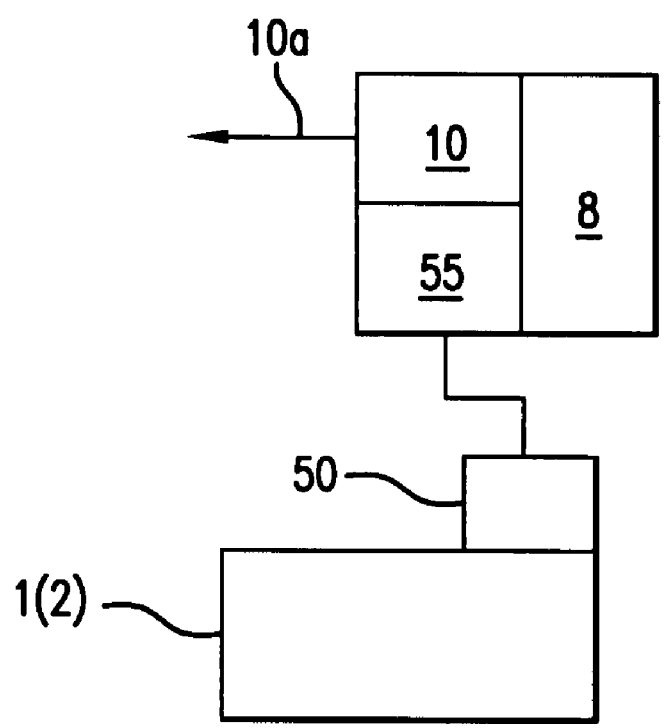
FIG. 15 is a block diagram schematic of yet another embodiment of the present invention including a control device.

Referring to FIG. 15 another configuration of the present invention is represented in a schematic block diagram wherein the sensor 50 is a temperature sensor and is attached to a vicinity of raceway portions of either the inner or outer raceway members 1(2), and an amount of lubricant discharged by the pump 10 is controlled by a controlling device 55 based on a detection output of the temperature sensor 50.

In some cases, the battery 6 and the lubricant storing tank 8 may be attached to the outer side face of the seal ring 5, and the pump 10 may be attached to the inner side face of the seal ring 5. When the battery 6 and the lubricant storing tank 8 are attached to the outer side face of the seal ring 5 as described above, it is not required to detach the seal ring 5 when the lubricant is to be resupplied. Accordingly, a work of charging a secondary battery, exchanging a primary battery, or resupplying the lubricant is extremely easily conducted.

Figure 9:
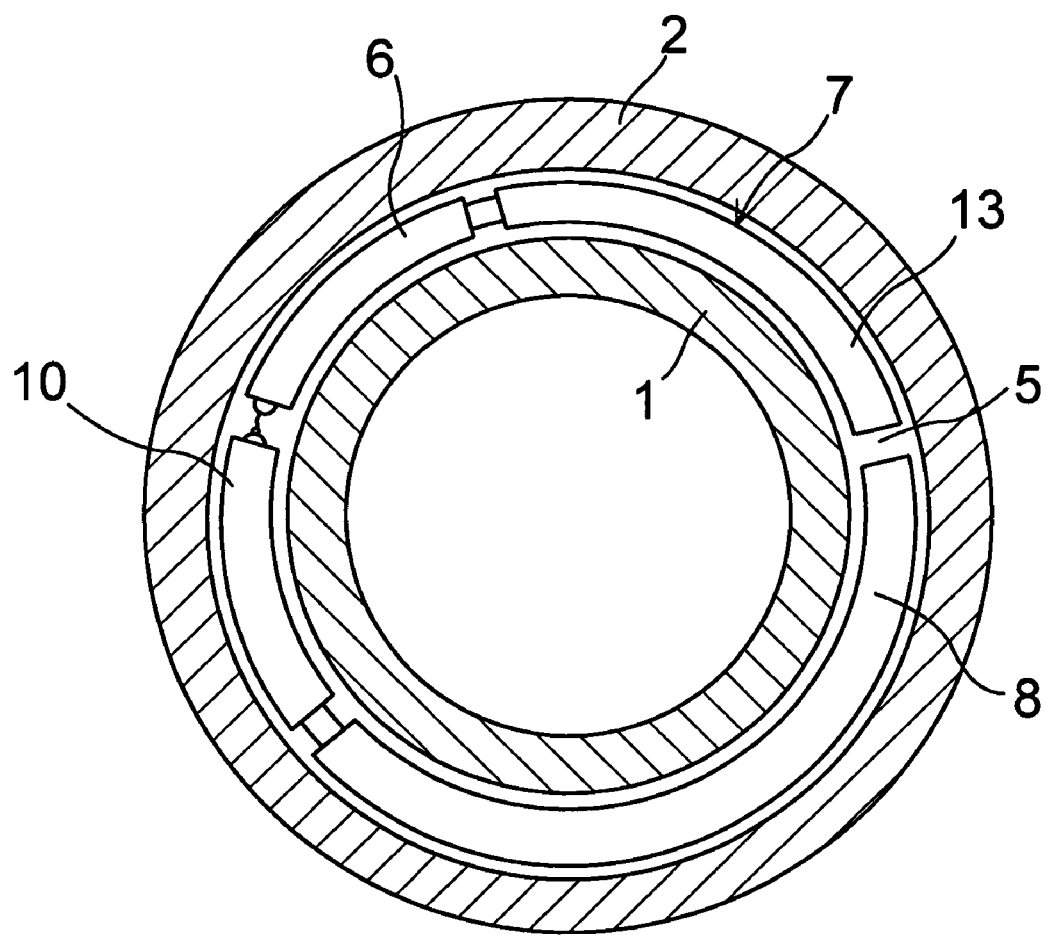
FIG. 9 is a section view showing the configuration of a third embodiment of the bearing device of the invention, looking in a direction perpendicular to the axial direction.
Figure 10:
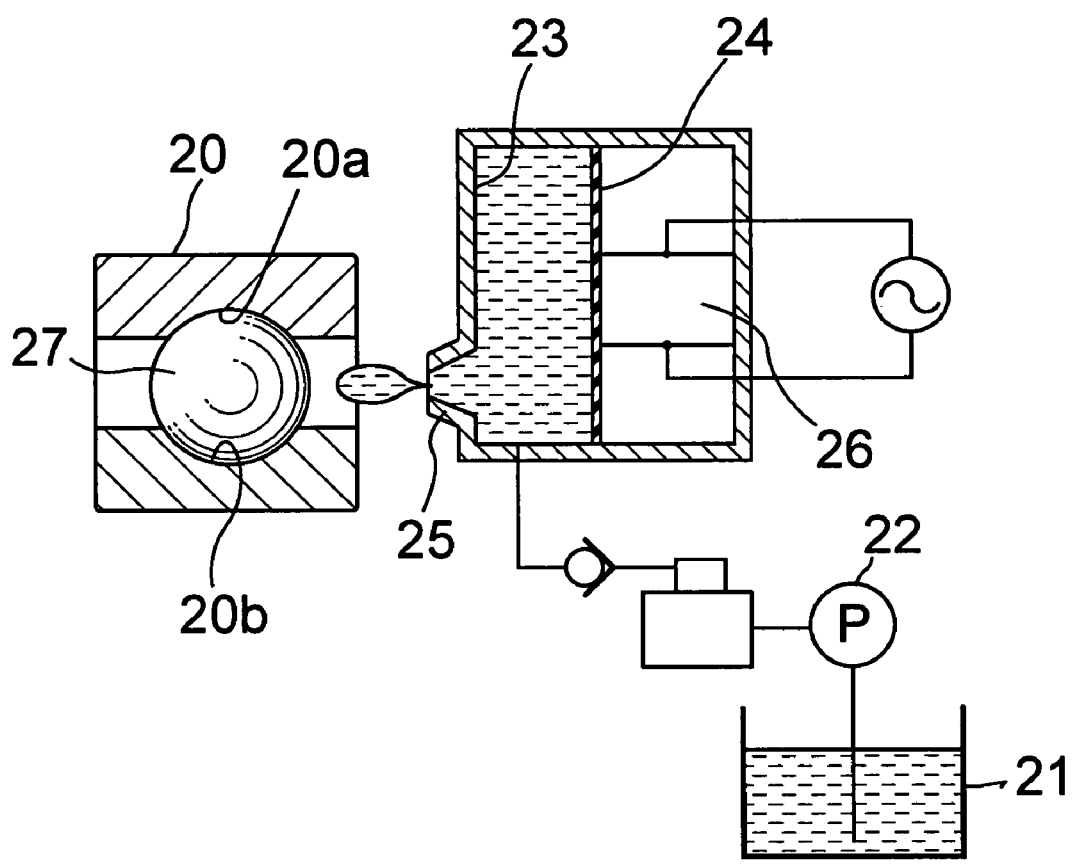
FIG. 10 is a view showing the configuration of a prior art bearing device comprising a lubricant storing tank and a supply device.
Figure 11A:
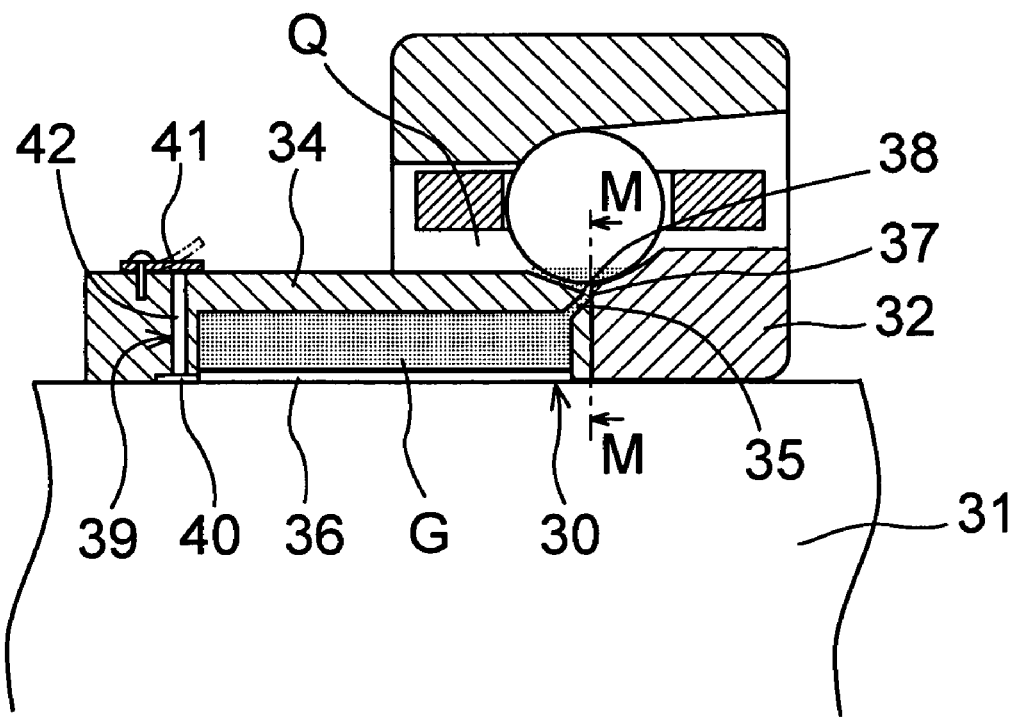
FIG. 11(A) is a view showing the configuration of a prior art bearing device comprising a lubricant chamber and a mechanism which supplies lubricant from the chamber.
Figure 11B:
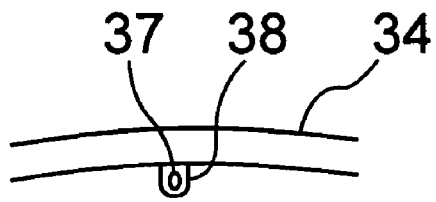
FIG. 11(B) is an enlarged view taken along the line M-M in FIG. 11(A), looking in the direction of the arrows.

FIG. 9 is a view showing a third embodiment of the bearing device of the invention, and showing the configuration of the bearing device in which a fuel cell is used as one kind of the battery 6. In this case, for example, a methanol tank 13 for supplying hydrogen to the fuel cell 6 is disposed in the unit body 7.

In the three embodiments described above, the bearing device of the invention is a so-called bearing of the deep groove type configured by the inner ring 1, the outer ring 2, and the rolling elements (balls) 3 held by the cage 4. The invention is not restricted to this, and may be applied to all types of bearings such as a bearing of the angular type, a cylindrical roller bearing, and a conical rolling bearing.

As a fuel source for the fuel cell 6 of the unit body 7, methanol in the tank 13 is used. It is a matter of course that hydrogen can be obtained by reforming a natural gas or a gasoline, in place of methanol. In this case, a corresponding fuel tank is used. Moreover, needless to say, a hydrogen fuel tank can be directly installed.

In the above examples, the rolling bearing has been described. The invention can be applied also to other bearing devices such as a linear bearing in which a raceway member is linear, a ball screw, and a slide bearing. In such a case, the condition of the unit body may be appropriately determined in accordance with the shape of the raceway member of the bearing device.

INDUSTRIAL APPLICABILITY

As described above in detail, according to the invention, the lubricant supply unit is additionally disposed for the bearing device, and hence it is possible to provide a fuel cell-mounted all-in-one bearing in which the lubricant supply unit can be easily mounted, and which is extremely compact and can operate for a long term.

Moreover, the battery, the functioning element (pump) driven by the battery, the tank for storing lubricant, and the like may be formed as a unit body so as to be integrally attached to the bearing in a detachable manner.

Particularly, in the case where a fuel cell is used as the driving source for the micro pump for supplying lubricant to the bearing, it is possible to use the fuel cell without exchange or charging, as compared with a primary battery or a secondary battery having the same size, in relation to the required electric power. Therefore, the driving time is long, and the lubricant can be automatically supplied for a long term, so that the bearing device is suitable for a "maintenance free" operation. Accordingly, the driving device is suitable also for a bearing for a spindle of a machine tool in which a slight amount of lubricant is supplied for a long term with a reduced number of maintenance works.

The unit body itself can be made to be compact and slim, and it is possible to provide a bearing device which can be mounted on a smaller bearing, and in which lubricant can be automatically supplied for a long term.

The lubricant supply unit body in the invention supplies lubricant to the bearing device as necessary. Consequently, there is not any waste such as that lubricant is supplied in an unnecessary occasion. Thus, it is possible to contribute to the long-term stabilization of the rolling property.

The invention claimed is:

1. A bearing device comprising:
   raceway members which perform relative motion and have opposed faces;
   a lubricant supply unit body which supplies lubricant is disposed between the opposed faces of said raceway members; and
   said lubricant supply unit body comprises:
   a pump which discharges the lubricant;
   a nozzle attached to the pump and having a nozzle open end for discharging the lubricant; and
   the nozzle open end being disposed between said opposed faces of said raceway members.

2. A bearing device according to claim 1, wherein said lubricant supply unit body includes a driving portion for said pump which is an electric generator having a power generating capacity according to a rotational speed of the bearing device, and an amount of lubricant discharged by said pump is controlled in accordance with the power generating capacity of said electric generator.

3. A bearing device according to claim 1, wherein said lubricant supply unit body includes a driving portion for said pump which is a battery.

4. A bearing device according to claim 3, wherein said battery is a fuel cell.

5. A bearing device according to claim 4, wherein said lubricant supply unit body comprises storing means from which hydrogen for said fuel cell can be taken out.

6. A bearing device according to claim 1, wherein said lubricant supply unit body comprises a lubricant storing tank.

7. A bearing device according to claim 1, wherein said raceway members and said lubricant supply unit body have a ring-like shape and are disposed coaxially.

8. A bearing device according to claim 7, wherein said bearing device is a rolling bearing in which said raceway members are an inner ring and an outer ring, and which comprises a plurality of rolling elements between said inner and outer rings.

9. A bearing device according to claim 7, wherein said raceway members include a stationary raceway member and a rotating raceway member, and said lubricant supply unit body is detachably attached to a vicinity of a shoulder portion of a circumferential face of said stationary raceway member which is opposed to said rotating raceway member.

10. A bearing device according to claim 1, wherein said lubricant supply unit body comprises a sensor which detects a lubrication condition between said opposed faces of said raceway members, and said pump is functionally controlled based on a detection output from said sensor.

11. A bearing device according to claim 10, further comprising a controlling means controlling an amount of lubricant discharged by said pump, wherein said sensor is a temperature sensor, said temperature sensor is attached to a vicinity of raceway portions of at least one of said raceway members, and the amount of lubricant discharged by said pump is controlled by said controlling means based on a detection output of said temperature sensor.

12. A bearing device according to claim 10, wherein relationships between an output value of said sensor and a lubrication condition are previously obtained, the lubrication condition is predicted from a measured value of said sensor, and said pump is controlled in accordance with a result of the prediction.

13. A bearing device according to claim 1, wherein said pump is a diaphragm pump comprising a piezoelectric element and a diaphragm which is displaced in a reciprocating manner by said piezoelectric element.

14. A bearing device according to claim 1, wherein said pump comprises a motor.

15. A bearing device according to claim 1, further comprising:
   a lubricant storing tank;
   a driving portion driving said pump;
   a seal ring disposed to seal an opening between said raceway members and having an inner face facing between said raceway members and an outer face on a side opposite said inner face;
   said lubricant storing tank being detachably attached to said outer face of said seal ring; and
   said driving portion and said pump being disposed on said inner face of said seal ring.

16. The bearing device according to 1, wherein said pump comprises a control circuit, and said control circuit controls an amount of the lubricant discharged by the pump.

17. The bearing device according to 16, wherein said pump comprises a driving portion, and a control circuit connects between said pump and said driving portion for said pump.

18. A bearing device comprising:
   raceway members comprising outer and inner rings each having a raceway surface;
   rolling elements disposed between said outer and inner rings, and
   a lubricant supply unit body formed as a unit having at least a pump, and said lubricant supply unit body being detachably attached to a vicinity of a shoulder portion of an inner circumferential face of said outer ring or a vicinity of a shoulder portion of an outer circumferential face of said inner ring.

19. The bearing device according to claim 18, wherein said raceway members and said lubricant supply unit body have a ring-like shape and are disposed coaxially.

20. The bearing device according to claim 18, wherein said lubricant supply unit body includes a driving portion for said pump.

21. The bearing device according to claim 18, wherein said pump comprises a nozzle for discharging lubricant.

22. The bearing device according to 21, wherein an open end of said nozzle for discharging lubricant is disposed between opposed faces of said raceway members.

23. A bearing device according to 18, wherein a lubricant storing tank is formed in a unit with said lubricant supply unit body.

24. The bearing device according to 18, further comprising a seal ring disposed between said inner and outer rings.

25. A bearing device, comprising:
   a bearing comprising:
     an outer ring having an inner circumferential surface including a raceway surface;
     an inner ring having an outer circumferential surface including a raceway surface; and
     rolling elements and a seal ring which are disposed between said outer and inner rings;
   a lubricant supply unit body formed as a unit including:
     a lubricant storing tank; and
     a pump pumping lubricant from the lubricant storing tank; and
   said lubricant supply unit body being detachably attached to a vicinity of a shoulder portion of the inner circumferential face of said outer ring or a vicinity of a shoulder portion of the outer circumferential face of said inner ring, or to an inner side face of said seal ring.

26. A bearing device comprising:
raceway members which perform relative motion and have opposed faces;
a lubricant supply unit body which supplies lubricant to a space between said opposed faces and is disposed between the opposed faces of said raceway members; and
said lubricant supply unit body comprises:
a pump which discharges the lubricant;
a nozzle attached to the pump and having a nozzle open end for discharging the lubricant; and
a driving portion for driving the pump.

27. The bearing device according to claim 26, wherein the open end of said nozzle for discharging lubricant is disposed between said opposed faces of said raceway members.

28. The bearing device according to claim 27, wherein said lubricant supply unit body comprises a lubricant storing tank.

29. The bearing device according to claim 27, wherein said pump is a diaphragm pump comprising a piezoelectric element and a diaphragm which is displaced in a reciprocating manner by said piezoelectric element.

30. A bearing device comprising:
raceway members which perform relative motion and have opposed faces;
a lubricant supply unit body which supplies lubricant to a space between said opposed faces and is disposed between the opposed faces of said raceway members; and
said lubricant supply unit body comprises:
a pump which discharges the lubricant; and
a control circuit for controlling an amount of lubricant discharged by said pump.

31. The bearing device according to claim 30, wherein said pump comprises a nozzle for discharging lubricant.

32. The bearing device according to claim 30, wherein said lubricant supply unit body comprises a lubricant storing tank.

33. The bearing device according to claim 30, wherein said pump is a diaphragm pump comprising a piezoelectric element and a diaphragm which is displaced in a reciprocating manner by said piezoelectric element.

34. A bearing device, comprising:
a bearing comprising:
an outer ring having an inner circumferential surface including a raceway surface;
an inner ring having an outer circumferential surface including a raceway surface; and
rolling elements disposed between said outer and inner rings;
a lubricant supply unit body formed as a unit including a pump which has a nozzle for discharging lubricant; and
said lubricant supply unit body being detachably attached to a vicinity of a shoulder portion of the inner circumferential face of said outer ring or a vicinity of a shoulder portion of the outer circumferential face of said inner ring.

35. The bearing device according to claim 34, wherein said pump is a diaphragm pump comprising a piezoelectric element and a diaphragm which is displaced in a reciprocating manner by said piezoelectric element.

36. The bearing device according to 34, a lubricant storing tank is formed in a unit as said lubricant supply unit body.

37. A bearing device, comprising:
a bearing comprising:
an outer ring having an inner circumferential surface including a raceway surface;
an inner ring having an outer circumferential surface including a raceway surface; and
rolling elements disposed between said outer and inner rings;
a lubricant supply unit body formed as a unit including:
a pump discharging lubricant; and
a control circuit for controlling an amount of lubricant discharged by said pump; and
said lubricant supply unit body being detachably attached to a vicinity of a shoulder portion of the inner circumferential face of said outer ring or a vicinity of a shoulder portion of the outer circumferential face of said inner ring.

38. The bearing device according to claim 37, wherein said pump is a diaphragm pump comprising a piezoelectric element and a diaphragm which is displaced in a reciprocating manner by said piezoelectric element.

39. The bearing device according to 37, a lubricant storing tank is formed in a unit as said lubricant supply unit body.

40. A bearing device, comprising:
a bearing comprising:
an outer ring having an inner circumferential surface including a raceway surface;
an inner ring having an outer circumferential surface including a raceway surface; and
rolling elements and a seal ring which are disposed between said outer and inner rings;
a lubricant supply unit body formed as a unit including:
a lubricant storing tank; and
a pump pumping lubricant from the lubricant storing tank; and
a driving portion for driving said pump; and
said lubricant supply unit body being detachably attached to a vicinity of a shoulder portion of the inner circumferential face of said outer ring or a vicinity of a shoulder portion of the outer circumferential face of said inner ring, or to an inner side face of said seal ring.

41. A bearing device, comprising:
raceway members which perform relative motion and have opposed faces;
a lubricant supply unit body disposed between the races which supplies lubricant to a space disposed between the opposed faces of said raceway members; and
the lubricant supply unit body formed as a unit including:
a pump discharging said lubricant from a lubricant storing tank; and
a driving portion for driving said pump; and
said pump being detachably attached to the bearing device.

42. The bearing device according to claim 41, wherein said pump comprises a nozzle for discharging lubricant.

* * * * *